July 24, 1956  A. B. McKAIG  2,756,408
REMINDER ALARM DEVICE FOR DISCONNECTING VEHICLE LIGHTS
Filed June 1, 1954  2 Sheets-Sheet 1
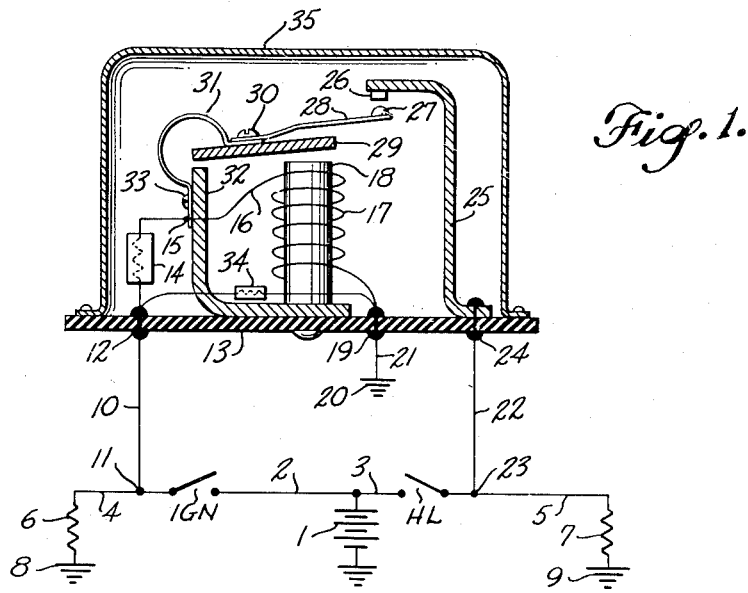
*Fig. 1.*
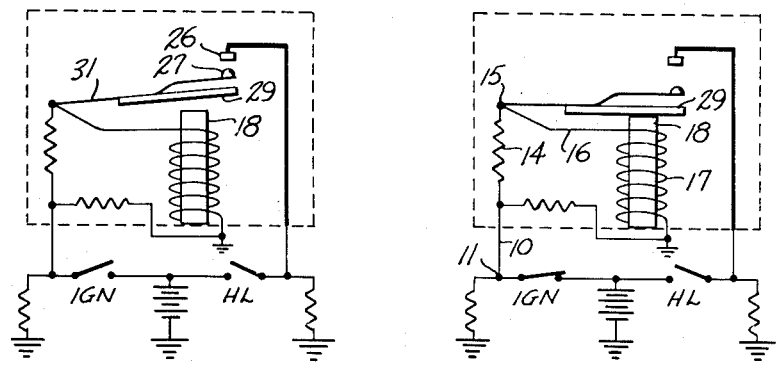
*Fig. 2.*   *Fig. 3.*
INVENTOR.
ARTHUR B. McKAIG
BY Roy Matterns
ATTORNEY INVENTOR.
ARTHUR B. McKAIG
BY Roy Mattern Jr.
ATTORNEYS United States Patent Office 2,756,408
Patented July 24, 1956

2,756,408

REMINDER ALARM DEVICE FOR DISCONNECTING VEHICLE LIGHTS

Arthur B. McKaig, Seattle, Wash., assignor to McKaig Electronics, Inc., Seattle, Wash., a corporation of Washington Application June 1, 1954, Serial No. 433,350

4 Claims. (Cl. 340—52)

This invention relates to an alarm device that operates when two or more electrical circuits have a certain simultaneous relationship one to another.

The purpose of the invention is to provide an alarm indicating that electrical energy is being consumed needlessly.

An object of the invention is to provide an alarm which indicates the undesired operation of an electrical circuit, which alarm is initiated only by the act of de-energizing another electrical circuit.

Another object of the invention is to provide an alarm for a vehicle to render an audible buzz when the headlights or taillights remain on after the ignition is turned off following the simultaneous operation of both.

Another object of the invention is to provide an alarm which supplements the circuits to which it is connected, but which does not interfere with their intended operation, and resets itself.

Another object of the invention is to provide an alarm which is easily manufactured at low cost.

Another object of the invention is to provide a compact pre-assembled alarm unit for convenient installation.

This invention, its purpose and its objects, will become more apparent as the following description of its application to the headlight and ignition circuits of a vehicle is read in conjunction with the drawings, wherein the same numeral refers to like components throughout the figures, where:

Figure 1 is a sectional view of the alarm device with the schematic addition of ignition and headlight circuits.

Figure 2 is a view similar to Figure 1, but drawn entirely schematically to illustrate the inactive positions of the components when the ignition and headlight switches are open.

Figure 3 is a view similar to Figure 2 showing the position of the components when the ignition switch is closed and the headlight switch remains open.

Figure 6:
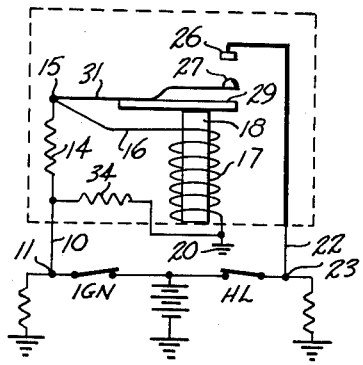
Figure 6 is a view similar to Figure 5 showing the position of the components when both the ignition and headlight switches are closed.
Figure 7:
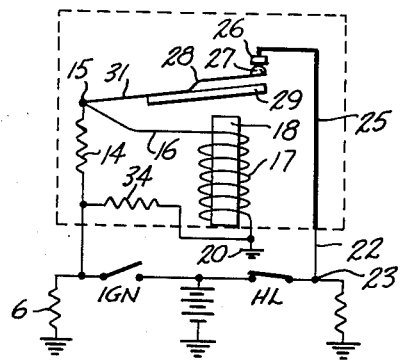
Figure 8:
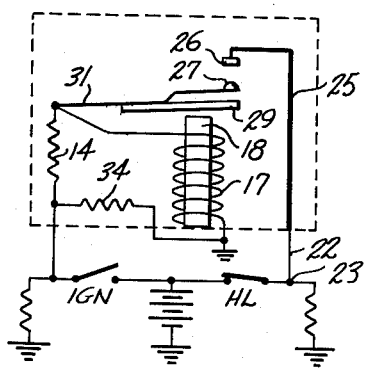

Figure 7 is a view similar to Figure 6 showing a momentary position of the components immediately after the ignition switch is opened while the headlight switch remains closed, this being the initial stage of the audible buzzing cycle, and Figure 8 is a view similar to Figure 7 showing the position of the components at the opposite extreme of the audible buzzing cycle commenced as shown in Figure 7.

The invention illustrated in these figures, in an embodiment designed for installation on an automobile, renders an alarm only when such a warning is needed and intended. Oftentimes, a motorist departs from his car, shutting off the ignition, but failing to turn off the headlights. This occurs, for example, under circumstances similar to the following conditions: parking a car on a well-lighted street in the evening; parking after driving through a fog or a tunnel during the day; or parking in daylight after having used the lights for night driving. The alarm warns the motorist leaving his car that his lights are still on when he might not otherwise be aware of it.

Referring to Figure 1 which is a sectional view of the alarm device connected to the headlight and ignition circuits, the source of energy is the automobile battery 1. Lead wires 2 and 3 connect the battery 1 to the ignition switch, IGN, and the headlight switch HL, respectively. These switches in turn are further connected by leads 4 and 5 to their respective loads collectively represented by resistances 6 and 7, that terminate at the ground points 8 and 9 generally located on a metallic part of the body or frame (not shown). The body or frame serves as the current return path to the battery 1.

These basic components found on substantially all automobiles in this general arrangement remain unchanged and the alarm components are connected to them. Wire 10 connects the alarm terminal 12 in the insulating base 13 of the alarm unit with the ignition circuit at point 11 located between the switch, IGN, and the ignition load 6. To continue this cricuit path into the alarm unit, an isolating resistor 14 is placed between the terminal 12 and a junction point 15. Wire 16 continues the path to coil 17 wound around the core 18 and terminated at base terminal 19, in turn connected to ground 20 by the lead wire 21.

In establishing a continuing current path into the alarm unit from the headlight circuit, wire 22 is connected to wire 5 at point 23 and to terminal 24 in the insulating base 13. On the inside of the alarm unit the terminal 24 is directly connected to the conducting contact support 25 that positions the contact point 26. Spaced below this contact point 26 is a complementary contact point 27 supported on a conductor-spring 28, which in turn is affixed to the armature 29 by the fastener 30. An additional conductor-spring 31 flexibly supports this armature 29 and its attachments just mentioned when it in turn is secured to the frame 32 by a fastener 33. The conductor-spring extends beyond its support location for connection to the junction point 15, noted previously with regard to the continuation of the ignition circuit into the alarm unit.

In addition to these components associated with the current paths just outlined, a resistor 34 is connected between the insulating base treminal points 12 and 19, and all the components of the alarm unit, exclusive of the ignition and headlight circuits, are enclosed for protection wtihin a cover 35 attached to the base 13.

The operation of this arrangement of the alarm components will be better understood by referring to the schematic Figures 2 through 8, inclusive. These figures are arranged to facilitate the explanation of why the alarm functions only when a motorist turns the ignition switch off and leaves the lights burning.

The inactive position of the alarm components when both the ignition and headlight switches are open is illustrated in Figure 2. Armature 29 is supported at rest by flexible spring 31 at some intermediate position between the extremes of its allowable travel, such that contact points 26 and 27 have an appreciable clearance between them, as do armature 29 and core 18.

Figure 3 illustrates the repositioning of the components which occurs upon closing the ignition switch. In this condition current flows from the ignition circuit through wire 10 to the alarm device; a substantial portion of the entering current passes through resistor 14 and hence through coil 17 to ground, resulting in the establishment of magnetic flux in core 18. The magnetic attraction thus created draws the armature 29 into contact with the core 18, thereby deflecting spring 31.

Figure 4:
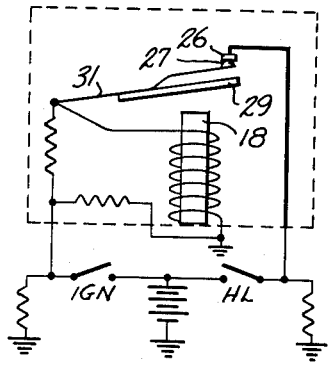
Figure 4 is a view similar to Figure 3 showing a momentary position of the components after the ignition switch is opened while the headlight switch remains open.

As shown in Figure 4, if the ignition switch is then opened, the headlight switch remaining open as before, current to coil 17 is cut off, the magnetic force in core 18 terminates and the force of spring 31 pulls the armature 29 away from core 18, thereby setting up an oscillatory motion of the armature and its attachment. The initial swing results in the mechanical touching of contact points 26 and 27, whereupon the direction of motion is reversed, and the armature then oscillates about its position of rest until the motion is damped out by friction.

Figure 5:
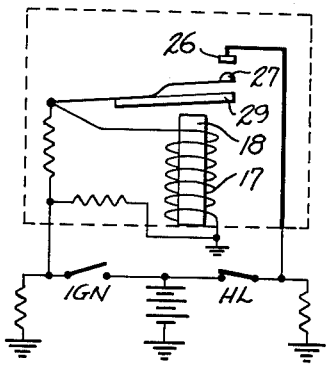
Figure 5 is a view similar to Figure 4 showing the inactive position of the components with the ignition switch open and the headlight switch closed.

If, on the other hand, the headlight switch is closed while the ignition switch remains open, no change at all occurs with regard to the alarm components, as shown in Figure 5, and the alarm remains inactive, as intended.

When both the headlight and the ignition switches are closed as shown in Figure 6, the armature 29 is moved into contact with the core 18 for the reasons noted when the ignition switch was closed as shown in Figure 3, and no alarm results.

The alarm will be actuated, however, following this concurrent closure of the ignition and headlight switches, if the ignition switch is opened while the headlight switch remains closed as shown in Figure 7. The opening of the ignition switch interrupts the supply of current to coil 17, permitting core 18 to release armature 29 as described above with reference to Figure 4. In this instance, however, contact point 26 is charged to full battery potential by virtue of its connection to the headlight circuit, which is now energized; therefore, when contact point 26 is touched by moving contact point 27, current from the headlight circuit flows through spring 28, spring 31, junction point 15, and to wire 16, with the result that full battery potential now appears across coil 17. This results in the maximum magnetic field being established in core 18, which imparts a strong downward motion to the armature 29 in addition to the mechanical rebound described in reference to Figure 4.

The subsequent parting of contacts 26 and 27 results in the loss of magnetic attraction, but the kinetic energy imparted to the armature during the period of magnetic attraction is sufficient to insure that the armature will return to the position shown in Figure 7. Whereupon this cycle will repeat indefinitely, in the manner of the well known buzzer.

The operation of this alarm differs from that of a conventional buzzer, in that once the oscillations are interrupted by removal of battery potential from contact point 26, the re-energizing of contact 26 will not re-establish the buzzer cycle; this is because armature 29 returns to the position of rest shown in Figure 2 when the headlight switch is opened, and the re-closing of the headlight switch will have no effect, as discussed in connection with Figure 5. The obvious practical result of this feature is that the alarm may be easily silenced by momentarily turning off the headlights if headlight operation is desired after the ignition switch has been turned off. In other words the alarm cannot be excited by the protected circuit (headlight circuit) so no separate shut-off is needed. Also the alarm resets itself. There is nothing to remember to prepare the alarm for additional service.

To avoid a disagreeable clattering of armature 29 against core 18, the lower limit of armature travel should be approximately as shown in Figure 8, which limit can be established by proper adjustment of the components; the normal buzzer sound of the device results from rapid oscillations of the armature assembly between the position shown in Figures 7 and 8.

The purpose of resistor 14 may be understood by referring to Figure 7, which shows the condition in which point 15 is raised to full battery potential; resistor 14 serves to limit the flow of current from junction point 15 to ignition load 6, thereby insuring that contact points 26 and 27 do not carry heavy currents. Resistor 34 is connected in parallel with the normal ignition load 6 and helps maintain stable operation of the alarm by insuring that a complete circuit across coil 17 always exists through resistor 14, thereby preventing any high induced voltage in coil 17 or other undesirable effects, regardless of variations in the resistance of ignition load 6.

I claim:

1. An audible alarm system for incorporation in the circuitry of a vehicle whereby the unwanted dissipation of electrical energy in a light circuit is indicated immediately following the opening of a related ignition circuit, comprising a supporting structure, and electromagnet on the said structure, a pair of electrical contacts resiliently mounted on the said structure within the effective field of the said electromagnet and spaced apart when both the ignition and the light circuits are de-energized, an electrical circuit of the alarm system for conducting current from the ignition circuit through the electromagnet to ground, and another electrical circuit of the alarm system for conducting current from the light circuit through the said contacts when closed and continuing through the said electromagnet to ground, the alarm occurring, when following the concurrent energization of both the ignition and light circuits, the ignition circuit is de-energized resulting in the de-energization of the electrical circuit of the alarm system associated with it whereby the electromagnet frees the contacts for oscillatory movement opening and closing the other electrical circuit of the alarm system which continues to receive energy from the headlight circuit.

2. An audible alarm system as defined in claim 1 and a resistor in the electrical circuit of the alarm system associated with the ignition circuit connected in parallel with the said electromagnet to prevent excessive flow of current through the said contacts and alarm circuit to the load and ground of the ignition circuit.

3. An audible alarm system as defined in claim 2 and a second resistor connected in the electrical circuit of the alarm system between the first resistor and the ground connection of the said electromagnet establishing the said second resistor as a parallel circuit to maintain stable operation of the alarm by insuring that a complete circuit across the electromagnet always exists through the first resistor thereby preventing any high induced voltage in the electromagnet caused by variations in the load of the ignition circuit.

4. An improvement in the electrical circuitry of vehicles to provide an alarm indicating unwanted headlight operation comprising an ignition auxiliary circuit in parallel with the ignition circuit between the ignition switch and ground and a headlight auxiliary circuit in parallel with the headlight circuit between the headlight switch and ground; the ignition auxiliary circuit comprising a resistance and an electromagnetic coil in series arranged in parallel with a second resistance of greater magnitude than the first resistance and a resiliently mounted electrical contact connected between the first resistance and the electromagnetic coil, and aligned with and spaced from the said coil; and the headlight auxiliary circuit comprising a rigidly mounted electrical contact spaced from but within the oscillating range of the said resiliently mounted electrical contact establishing a potential circuit from the said headlight switch through the two said contacts and the said electromagnetic coil to ground, the said auxiliary ignition and auxiliary headlight circuits thereby causing an alarm by the oscillation of the said resiliently mounted contact when and only when the said headlight switch remains closed immediately following the opening of the ignition switch when the said coil is de-energized releasing the said resiliently mounted contact for travel through its neutral position to reach the said rigidly mounted contact thereby energizing the said coil again as the auxiliary headlight circuit is completed, this causing the return of the resiliently mounted contact to the coil and thereafter its release and return to the rigidly mounted contact as the said coil becomes discharged upon the opening of the auxiliary headlight circuit whereby a continuing cycle is established as the basis for the alarm until the headlight switch is opened.

References Cited in the file of this patent

UNITED STATES PATENTS

| | | |
|---|---|---|
| 1,048,179 | Kratz | Dec. 24, 1912 |
| 1,461,215 | Hunt | July 10, 1923 |
| 2,014,237 | Miller | Sept. 10, 1935 |
| 2,101,407 | Morland | Dec. 7, 1937 |
| 2,439,634 | Robey | Apr. 13, 1948 |
| 2,507,398 | Castro | May 9, 1950 |